US010072797B2

(12) United States Patent
Fratti

(10) Patent No.: US 10,072,797 B2
(45) Date of Patent: Sep. 11, 2018

(54) METHOD TO PRODUCE HIGH-RESISTANCE COMPOSITE VESSELS WITH INNER METAL LINER AND VESSELS MADE BY SAID METHOD

(71) Applicant: C.N.G.V.d.o.o, Izola (SI)

(72) Inventor: Giovanni Fratti, Muggia (IT)

(73) Assignee: C.N.G.V. d.o.o., Izsola (SI)

( * ) Notice: Subject to any disclaimer, the term of this patent is extended or adjusted under 35 U.S.C. 154(b) by 131 days.

(21) Appl. No.: 15/110,859

(22) PCT Filed: Jan. 29, 2015

(86) PCT No.: PCT/IB2015/050668
§ 371 (c)(1),
(2) Date: Jul. 11, 2016

(87) PCT Pub. No.: WO2015/114549
PCT Pub. Date: Aug. 6, 2015

(65) Prior Publication Data
US 2016/0377228 A1  Dec. 29, 2016

(30) Foreign Application Priority Data

Jan. 31, 2014   (IT) .............................. PN2014A0007

(51) Int. Cl.
*F17C 1/04*  (2006.01)
*F17C 1/00*  (2006.01)

(52) U.S. Cl.
CPC ................. *F17C 1/04* (2013.01); *F17C 1/00* (2013.01); *F17C 1/002* (2013.01);
(Continued)

(58) Field of Classification Search
CPC ....... Y10T 29/49805; F17C 2209/2181; F17C 2203/0663
(Continued)

(56) References Cited

U.S. PATENT DOCUMENTS 3,064,344 A   11/1962  Arne
3,438,114 A   4/1969  Berman et al.
(Continued)

FOREIGN PATENT DOCUMENTS

DE   102006051376 A1   5/2008
DE   102011007361 A1   10/2012
(Continued)

OTHER PUBLICATIONS

English Translation of Burtscher DE 102011007361.*
(Continued)

*Primary Examiner* — Jason L Vaughan
*Assistant Examiner* — Amanda Meneghini
(74) *Attorney, Agent, or Firm* — Oliff PLC

(57) ABSTRACT

Method for the production of a high-resistance tank has an initial stage in which a closed metal vessel is formed, followed by a second stage in which the walls of the vessel are subjected to a mechanical pre-tensioning treatment in both the axial and radial directions, up to a predetermined value. This mechanical treatment has a stage in which the tank is enclosed inside a mould of suitably larger dimensions. A liquid is then introduced in the tank and pressurized until the tank walls are dilated and stretched to a point where they encounter the mould inner surface. Subsequently, the outside of the tank is coated with one or more layers of composite material, so as to complete the construction of the tank, upon which a final auto-frettage treatment is carried out. The type of steel to be used is AISI 304, preferably in its more weldable AISI 304L version.

18 Claims, 8 Drawing Sheets

(52) U.S. Cl.
CPC .......... *F17C 2201/0109* (2013.01); *F17C 2201/052* (2013.01); *F17C 2201/054* (2013.01); *F17C 2203/0604* (2013.01); *F17C 2203/0619* (2013.01); *F17C 2203/0639* (2013.01); *F17C 2203/0643* (2013.01); *F17C 2203/0646* (2013.01); *F17C 2203/0648* (2013.01); *F17C 2203/0663* (2013.01); *F17C 2203/0695* (2013.01); *F17C 2209/2181* (2013.01); *F17C 2209/221* (2013.01); *F17C 2221/012* (2013.01); *F17C 2221/033* (2013.01); *F17C 2223/0123* (2013.01); *F17C 2223/036* (2013.01); *F17C 2260/011* (2013.01); *F17C 2260/012* (2013.01); *F17C 2270/0105* (2013.01); *Y02E 60/321* (2013.01)

(58) Field of Classification Search
USPC ........................................ 29/421.1
See application file for complete search history.

(56) References Cited

U.S. PATENT DOCUMENTS

| | | | |
|---|---|---|---|
| 5,375,735 A | 12/1994 | Huvey et al. | |
| 5,556,601 A | 9/1996 | Huvey et al. | |
| 5,659,941 A | 8/1997 | Huvey | |
| 6,354,334 B1 | 3/2002 | Ellyin et al. | |
| 6,425,172 B1* | 7/2002 | Rutz | B29C 70/56 156/162 |
| 6,779,565 B1 | 8/2004 | Fawley | |
| 2002/0029449 A1 | 3/2002 | Portmann | |
| 2002/0029456 A1* | 3/2002 | Geissler | B21D 26/041 29/469 |
| 2003/0126732 A1* | 7/2003 | Okada | B21D 15/10 29/454 |
| 2009/0152278 A1* | 6/2009 | Lindner | F17C 1/00 220/589 |

FOREIGN PATENT DOCUMENTS

| | | |
|---|---|---|
| DE | 102011076480 A1 | 11/2012 |
| EP | 0487374 A1 | 5/1992 |
| FR | 1533686 A | 7/1968 |
| WO | 2004/096649 A2 | 11/2004 |

OTHER PUBLICATIONS

Mar. 23, 2015 International Search Report issued in International Patent Applicaiton No. PCT/IB2015/050668.

Mar. 23, 2015 Written Opinion issued in International Patent Applicaiton No. PCT/IB2015/050668.

* cited by examiner

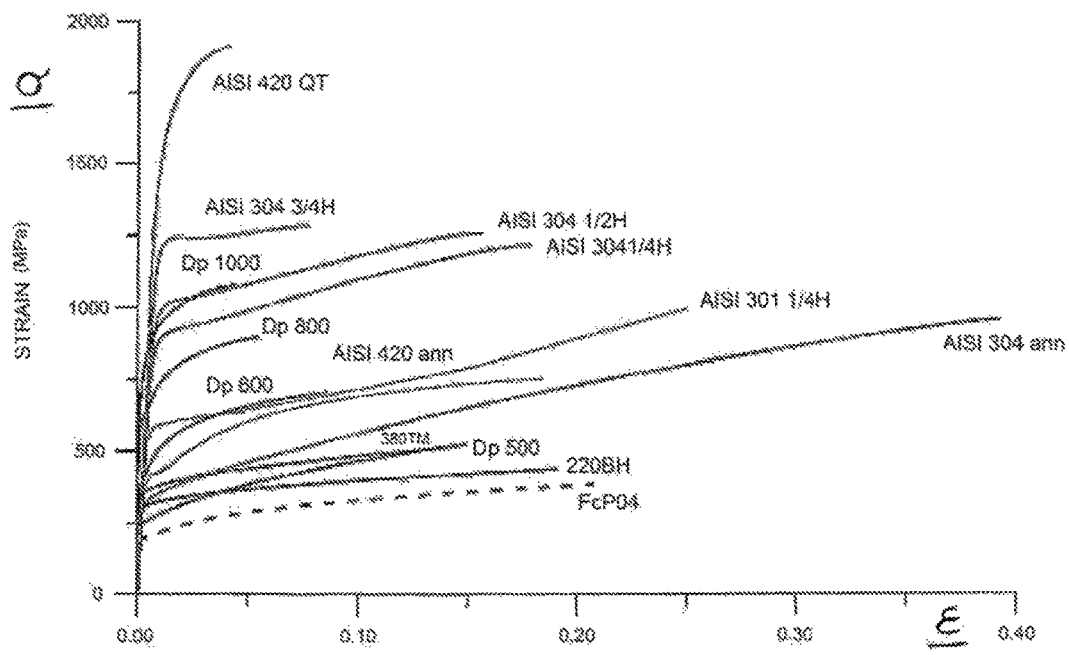
FIG. 1: curves σ-ε for stainless steel and carbon steel
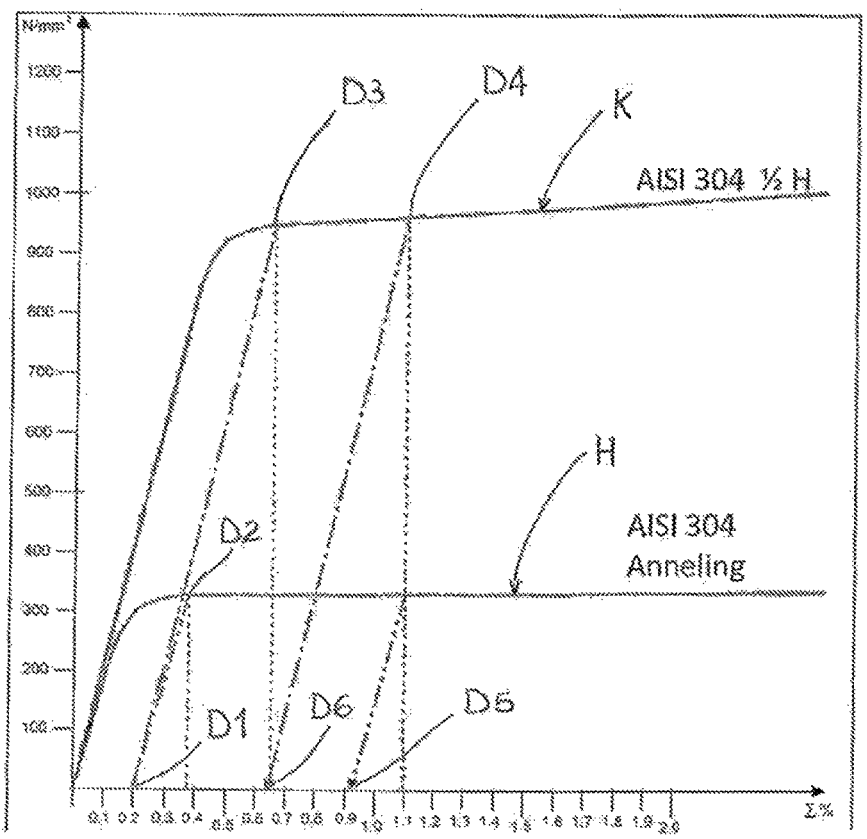
FIG. 2

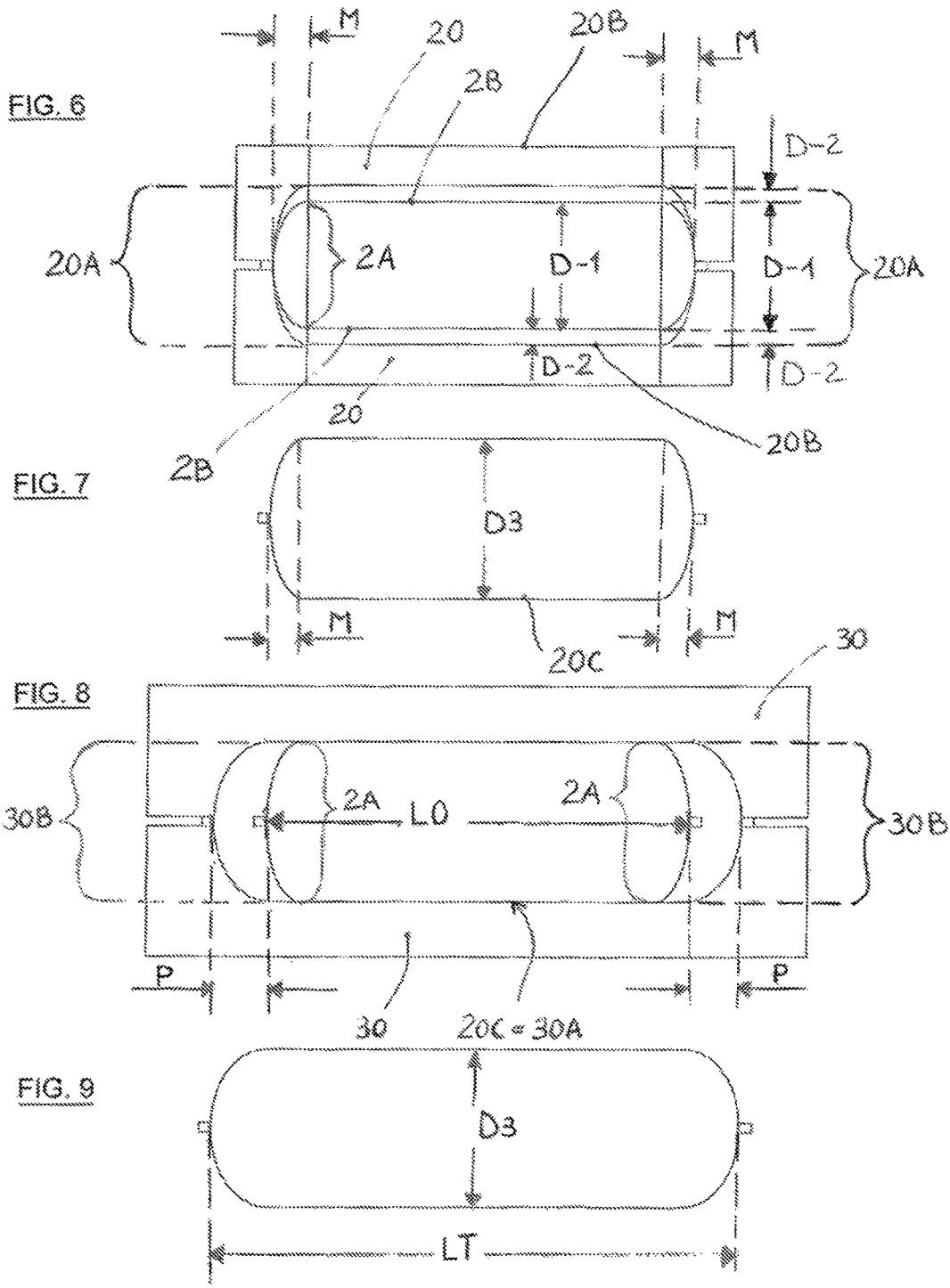

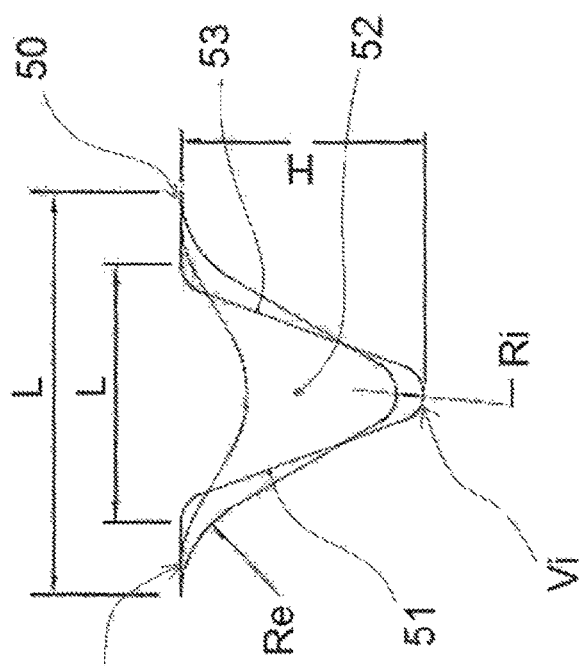
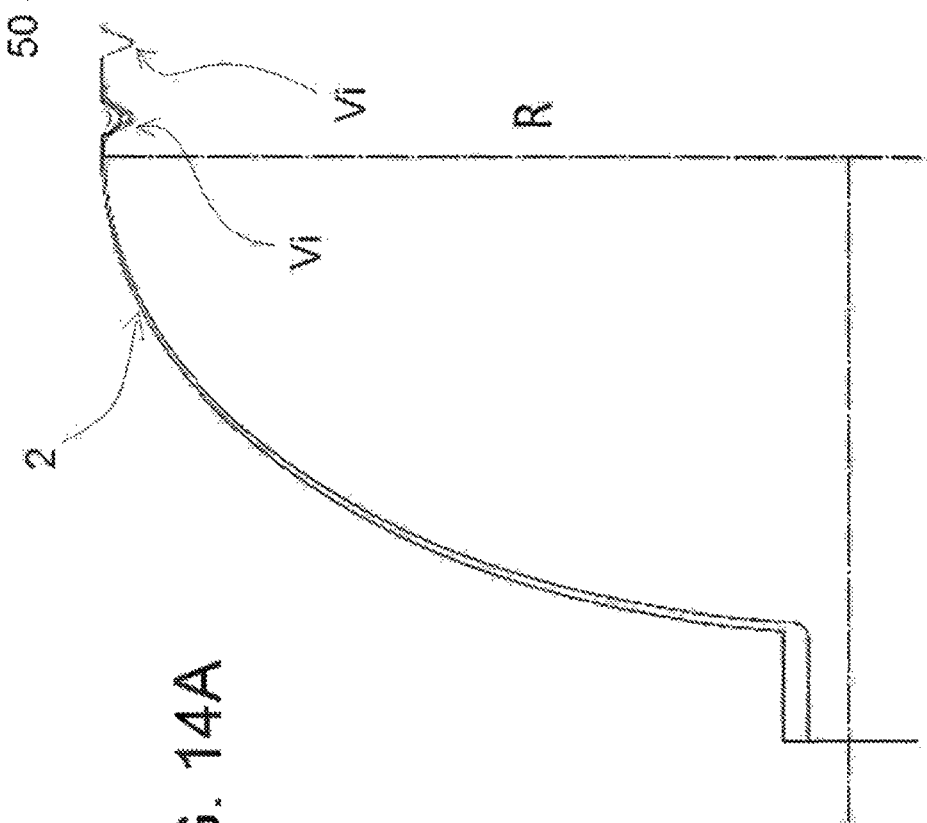
FIG. 14A
FIG. 14

METHOD TO PRODUCE HIGH-RESISTANCE COMPOSITE VESSELS WITH INNER METAL LINER AND VESSELS MADE BY SAID METHOD

The present invention relates to a method for the manufacture of metal vessels, hereinafter referred to as tanks, especially designed and constructed to hold a fluid, and in particular a gas, stored under very high pressure.

More specifically, the invention relates to the manufacture of tanks for the storage and transportation of gas under pressure, including flammable gases such as methane, ethane or any other gas mixtures of fossil origin, including petroleum by-products.

It is well-known that the production of fossil fuel gases is totally dependant upon the feasibility of transporting these gases from the production site to the points of distribution and consumption, which are quite frequently located far from the reservoirs.

When the transportation of gas by means of traditional pipelines is problematic or impossible due to a variety of reasons, such as geopolitical, environmental, technical, and more especially economic constraints, the desirability and advantages offered by sea transport, by means of suitably equipped ships, become apparent.

Ships have long and widely been used for transporting gas; however, this method of transportation encounters severe limitations resulting from the fact that the transportation of gas still in its gaseous state, though technically feasible, is not economically advantageous, inasmuch as it would require the construction of ships equipped with specific tanks designed to be filled with the gas compressed to a very high pressure.

Indeed, the manufacture of such tanks, designed to operate under very high pressure conditions, comes up against technical/economic restrictions deriving from the fact that a tank of this nature would have to be designed and manufactured principally to withstand the internal pressure, a factor which would require the wall of the tank to be highly resistant, therefore quite thick, if manufactured according to traditional techniques.

It is clear that this technical requirement is in conflict with three technical/economic limitations:

firstly, increasing the thickness of the tank wall is costly and would obviously detract from the economic advantages of the transportation method;

secondly, external volumes remaining unchanged, greater thickness of the tank wall causes a reduction in the internal volume available (payload), which further reduces the profit resulting from the overall cost of the tank versus the volume of the goods transported;

thirdly, increasing the thickness of the tank wall automatically results in greater tank weight. If the tanks are transported by ship, as in this instance, it becomes immediately apparent that, as every industry expert knows, the resulting weight increase requires the manufacture and use of larger ships (greater displacement), which in turn leads to a still greater reduction in the economic advantage of transporting compressed gas stored in tanks manufactured according to the traditional method.

A well-known method, devised to overcome these restrictions has been that of liquefying the gas and transporting it like a normal liquid, stored in suitable tanks under near-atmospheric pressure. In these conditions, the above-mentioned technical/economic restrictions, related to the transport by ship of gas under high pressure, with the specific onerous requirements discussed above, are basically overcome.

However, this method comes up against other, different technical/economic restrictions, which primarily consist in the fact that a gas liquefaction plant must be provided upstream of the loading point of the vessel, while corresponding re-gasification facilities must be made available at the point of disembarkation of the load.

These fundamental drawbacks mean that the overall cost of transportation is significantly increased due to the capital and operating costs of the plants, including the cost of the energy required for gas liquefaction.

As all the considerations succinctly outlined above are well-known to industry experts, they will not be discussed here further.

In order to overcome the above-mentioned limits, various techniques have been developed for the design and manufacture of tanks suitable for the transportation of gas under high pressure, typically over 100 Bar.

The method described in U.S. Pat. No. 6,425,172, is well known. It relates to the manufacture of a tank starting from a metal liner (hereinafter referred to as "liner"), which is then wrapped with one or more layers of resin-impregnated fiber-reinforced structural composites, followed by the equalization of the tensions of the tensile stress between the various fibres of the composite material impregnated by means of a heating method and a subsequent slow cooling method.

This method can be combined with a known auto-frettage treatment whose purposes are also well known.

This method, to which cylindrical steel tanks designed to withstand high pressures are normally subjected, consists in subjecting the tank to an internal pressure whereby the material is stretched beyond its elastic limit, so that the tank suffers limited permanent deformation. This results in permanent hardening and elongation of the material, which is greater in the inner layers. These, after the pressure is released, will exert a strain on the outer layers. This tensioning of the outer layers, which is still within their elastic limit, will produce around the inner layers a state of pre-stress even at zero pressure. When the inner layers are next subjected to pressure, being already pre-stressed and subject to the same operating load, they will be in a state of lower tension. To sum up, in order to reduce the thickness of the liner and its weight while preserving or increasing the safety factors, this autofrettage technique is employed in order to pre-stress a part of, or the entire thickness of, the liner in order to extend the range of elastic deformation without reducing fatigue resistance but possibly, in some cases, enhancing it.

The auto-frettage technique, as applied to vessels or tanks under pressure made of composite materials, consists in the exertion of sufficient pressure to reach and exceed the metal's yield strength and the tank's testing pressure, which is usually 1.5 times the operating pressure, so that the deformation is permanent and stable throughout the operating life of the tank, even after the necessary retests required by the legislation in force. This plastic deformation involves only the metal wall, both in the axial and circumferential directions, whereas the outer layer, made of composite material, remains within its elastic range. This characteristic is typical of carbon, glass and aramid fibers.

As mentioned above, the autofrettage method is carried out upon the finished tank, i.e. after it has been wrapped with the composite material. It is typically carried out by introducing a liquid into the tank, particularly a high pressure liquid, in order to permanently deform the inner liner. This deformation may exceed 0.95-1.8%. Considering that the elongation at fracture of these fibers ranges from 1.9 to 3.6%, and considering moreover the safety factor in relation to the operating pressure, which ranges from 2.35 to 3.6, we can state that during the hydraulic test the maximum elongation can exceed:

0.95% for carbon and aramid fibers,
1.8% for glass.

This technique does not produce any significant improvements either with regard to any greater volume of the tank or to increased circumferential and axial resistance of the entire tank, as these factors depend on the breaking load of the liner and of the composite material, which are not significantly modified by the autofrettage method.

In the case of cylinders with metal liner externally reinforced by carbon, glass, or Kevlar fibers impregnated with thermosetting resins or resins incorporated in thermoplastics, the elastic moduli of the liner and the composite material, respectively, can be very different. Here are a few examples:

most steel alloys have a "Young's modulus of elasticity" E within the range of 190,000-215,000 N/mm$^2$;
most aluminium alloys have a modulus E ranging from 64,000 and 80,000 N/mm$^2$;
the most widely used carbon fiber and epoxy resin composites have a modulus E ranging from 138,000 and 175,000 N/mm$^2$
glass fiber and epoxy resin composites have a modulus E ranging from 44,000 and 60,000 N/mm$^2$.

From an industrial point of view, the most inexpensive composites are generally chosen, which means glass fiber composites. However, it is obvious that it we were to choose the combination steel liner/fiberglass composite (the most economical combination) we would have a very different elastic modulus. This means that, during the first stage of the loading method (when the tank is first loaded to the set pressure), most of the specific stress, $\sigma=E^*\varepsilon$ (Hooke's law), will be absorbed by the liner, which has a modulus of elasticity E over 3 times as large as that of the composite, while, congruously, the stretching of the liner and the composite at their interface is identical.

If we wish to adopt a minimum permissible safety coefficient, for example 3, relative to the operating pressure, it means that the vessel or tank should burst at a pressure no lower than 3 times the operating pressure.

If at the bursting pressure the fibers of the composite material break, it means that they have reached their maximum permissible load, or, in other words, their maximum deformation allowed, and therefore, still with reference to fiberglass, an elongation of 3.6%.

As the behaviour of these fibers, as mentioned above, is practically linear up to the breaking point, it follows that we can calculate the deformations corresponding both to the operating pressure=3.6/3=1.2%, as well as to the test pressure, which, according to the current standards, is normally set at 1.5 times the operating pressure=1.5×1.2=1.8%.

With these deformations, steel alloys as well as aluminium alloys are both well within plastic range.

Moreover, in order to obtain a permanent and stable deformation at the next periodic hydraulic retests, which are required by current standards, it is necessary to increase this deformation by a percentage, even a minimal one.

This line of reasoning is all the more valid if the other fundamental relation is considered concerning the equilibrium of forces.

Tension $\sigma$ is also defined as F/A, where F is the load or total force, and A is the surface upon which this force is exerted.

In order to reduce costs and weights while simultaneously increasing volumes, maintaining unaltered the overall exterior dimensions, it is necessary to reduce the thickness of the materials, i.e. the value of A, which is a function of the thickness. In fact, if we consider a cross section of wall with unit length, we can say A=S×1 and therefore:

$\sigma=F/A=F/S^*1=E^*\varepsilon$

This means that, if F, which is directly connected with the loading pressure, remains the same, the smaller S is the higher $\sigma$ is, and since E is constant, the value of $\varepsilon$, i.e. the specific elongations, must increase.

It follows that, using the safety coefficients required by current standards, and minimum liner thicknesses in order to reduce costs and weights, the auto-frettage method (hereinafter referred to as "autofrettage") becomes inevitable and consequent to the manufacture and certification of said vessels and tanks.

This method also has certain advantages if it is conveniently applied. Indeed, when the autofrettage pressure is released, the walls of the liner are put under compression, so, when internal pressure is applied once more on the same vessel, the stress on the liner will be lower. This means that the median value of $\sigma$ on the liner's material will be smaller and, as experiments have shown, the fatigue behaviour will be correspondingly improved.

However, great attention must be paid to the selection of the materials to be used, as well as the dimensions of the walls, as excessive plasticity or low ductility of the material could induce excessive work hardening of the material itself, with consequent embrittlement and reduction, even drastic reduction, of the fatigue life.

This risk becomes even greater if the gas, or more generally the fluid, that must be introduced in the vessel, contains impurities that may cause the well-known phenomena of stress corrosion or embrittlement from nascent hydrogen.

After autofrettage, if the permanent deformations are excessive, then also the compressive stresses induced by the composite into the walls of the liner will be very high. A well-known phenomenon could occur in these conditions, i.e. "elastic instability due to axial load", or buckling, an event which would cause the liner to collapse into the vessel, with the consequent detachment of the composite from the walls. This phenomenon must be absolutely avoided, as it would lead, after just a few times that the vessel is loaded and unloaded, to the total collapse of the walls of the metal liner.

In order to avoid this phenomenon, materials with low modulus of elasticity should be used. This has led to the use of liners made of plastic or polymers. However, vessels made of such plastic or polymeric materials do not ensure a perfect seal, as polymeric materials are permeable to gas. Moreover, existing technologies do not enable the manufacture of vessels of large dimensions (with diameters of 2 to 3 m. and lengths in excess of 10-12 m.). Even joining various distinct portions of the same vessel, in particular the o gives with the outlets, which must be made of metal, causes problems that are not easy to solve, as coupling is problematic and localized leaks do occur.

From patents DE 102011007361 and DE 102011076480, a type of tank equipped with an inner liner and an outer shell made of composite material, designed to increase both the tank's capacity and its resistance to high internal pressure, has become well known. Indeed, the tanks which are the subject of these patents are designed to be used as gas fuel storage tanks for application in the automotive industry, in particular they are designed to hold hydrogen in its gaseous state, especially under high pressure.

Said patents disclose the method of subjecting said tanks, and particularly their liners, to a pre-tensioning treatment, i.e. to preliminary stressing of the liner before carrying out the normal auto-frettage method.

The first of the above-mentioned patents discloses a preliminary treatment of the liner where the latter, before being wrapped with the composite material, is compressed lengthwise so as to be shortened; subsequently, it is wrapped with the composite material, which is heated until it is polymerized/stabilized. The tank is subsequently released from the initial pre-tensioning condition (shortening due to compression) and is subjected to auto-frettage treatment. In practice, with this treatment the liner is partially compressed with respect to the outer shell which is initially tensioned, an operation which anticipates in a small measure the auto-frettage treatment.

The second of the above-mentioned patents discloses a treatment based on unidirectional pre-tensioning, which is followed by an auto-frettage treatment, preferably in an iterated manner so as not to stress the material excessively.

However, such methods, though representing a definite improvement over state-of-the-art methods and being specifically designed for the described application, are not suitable for application on tanks having much larger dimensions, and with much higher operating pressures, in the order of hundreds of bar. More importantly, they do not offer significant improvements with regards to the volume/weight ratio.

DE 10 2006 051 376 discloses a pressure vessel having a wall, which is molded from a preform by cylindrical flow turning in two overfalls. A wall thickness reduction of forty percent or more is realized in an overfall and in another overfall a wall thickness reduction of seventy percent or more is realized. The preform is optionally manufactured from a clock by the hot forming reverse can extrusion process, from a sheet-metal blank by deep drawing or by pressing, and from a pipe, whose base is drawn and closed without additional material.

It would therefore be desirable, and is the main object of the present invention, to devise a method for the manufacture of tanks, featuring:

an inner liner designed as a sealed continuous metal vessel,
and an outer shell consisting of one or more layers of suitably impregnated composite material,
  designed to offer excellent characteristics of resistance to the pressure of the gas introduced into said tank,
  which is particularly advantageous in the manufacture of high capacity tanks, in the order of a few hundred $m^3$,
  and which represents a significant improvement in terms of liner thickness, i.e. its weight and manufacturing costs,
  which can be manufactured from hybrid composite materials, using also glass fibers which are particularly inexpensive.

Moreover, said method must be simple and safe to carry out, using well-known methods.

This and other purposes are achieved by means of a method and related tank, manufactured according to the attached claims.

The characteristics and advantages of the invention are made evident in the following description, provided by way of non-limiting example and referring to the attached figures, where:

FIG. 1 shows a generic and typical form of the elasticity curve for some types of steel most commonly used in the art;

FIG. 2 shows a simplified outline of two different forms of the elasticity curve for an austenitic stainless steel when it is subjected to two different and respective pre-tensioning/work hardening treatments according to the invention and commonly used in the art;

FIG. 6 is a symbolic illustration of the first stage of a liner work-hardening method according to the invention;

FIG. 7 shows a simplified outer plan view of the liner manufactured after the stage shown in FIG. 6;

FIG. 8 is a symbolic illustration of the second stage of the liner work-hardening method after the first stage according to FIG. 6 above;

FIG. 9 shows a simplified outer plan view of the liner manufactured after the second stage shown in FIG. 8;

Figure 10:
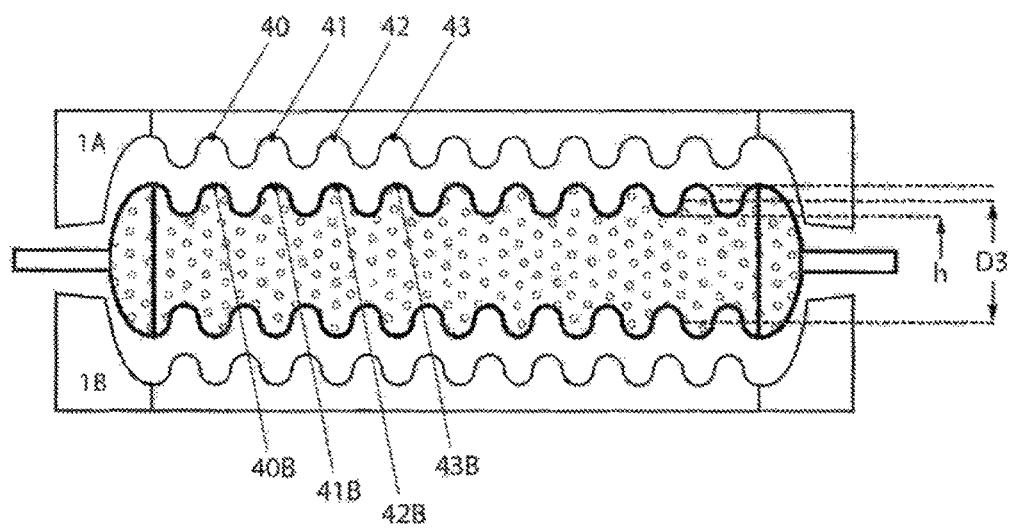
FIG. 10 shows symbolically an improved embodiment of a production mould and a related liner.
Figure 11:
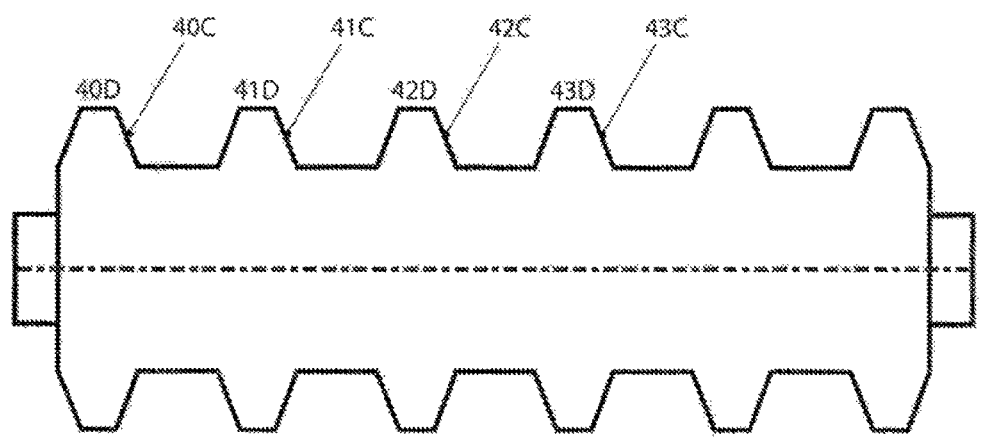
Figure 12:
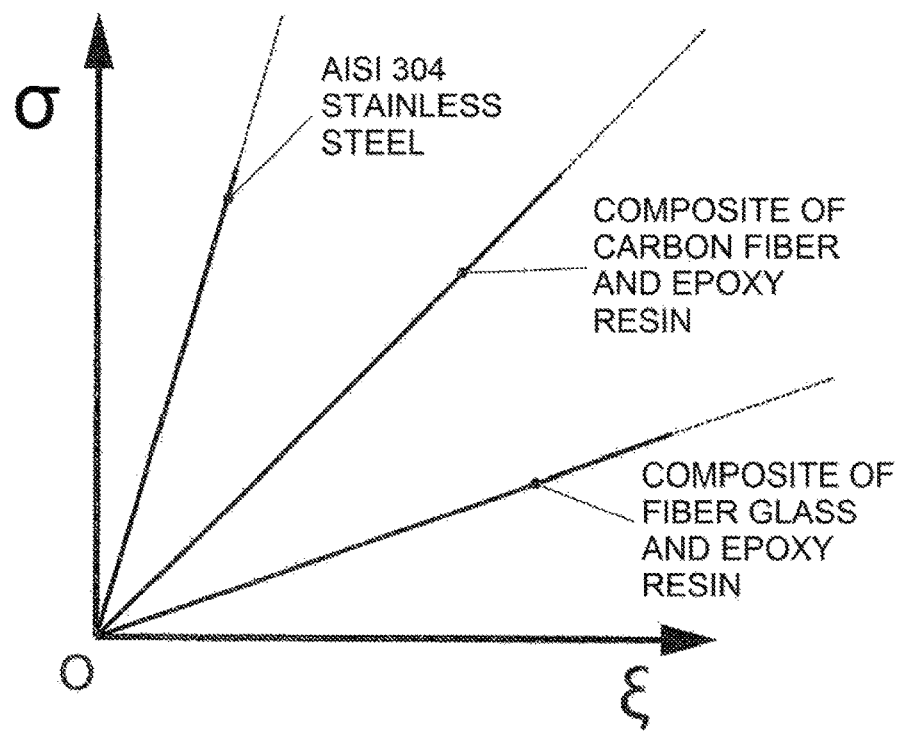
Figure 13:
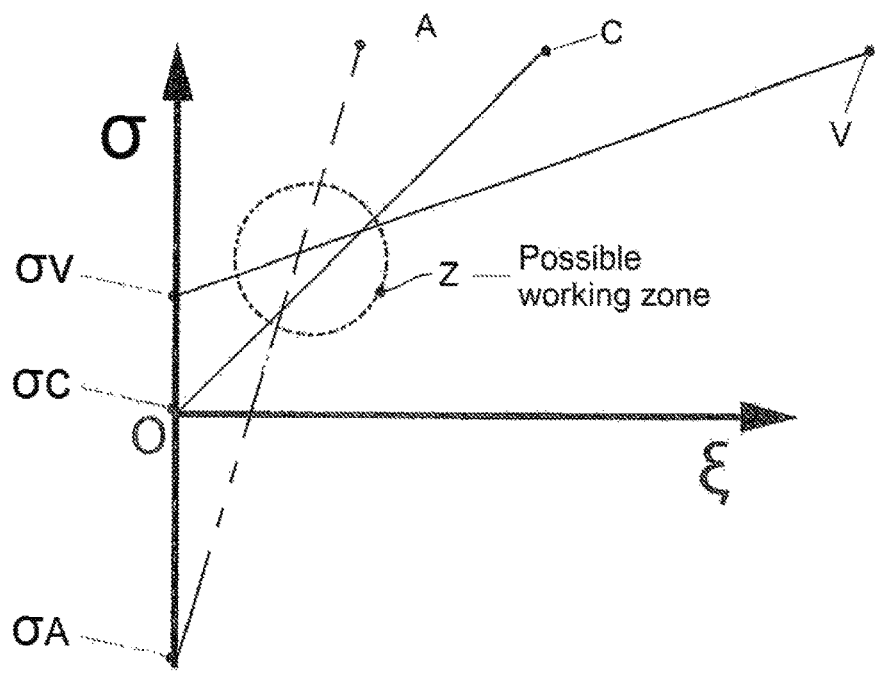

FIG. 11 schematically shows a portion of an improved different embodiment of the outer wall of the liner of FIG. 10;

FIG. 12 schematically shows the profile of the modulus of elasticity of some materials which are preferably used to carry out a liner according to the invention;

FIG. 13 schematically shows the positioning and the profiles of the load curves of the materials of FIG. 12, according to an improved production step of the invention;

FIG. 14 shows an enlargement of a portion of the outer wall of a liner generally shown in FIG. 10;

FIG. 14A shows an end portion of a liner whose wall is provided with furrows exemplarily shown in FIG. 14.

The description and claims which follow refer to a hypothetical tank consisting of an inner liner and outer shell made of composite material.

The liner is intended to be manufactured using conventional materials such as aluminium alloys or steel, and according to current manufacturing technologies, such as welding different suitably shaped metal sheets, or a single piece obtained from sheet metal, tube or billet using state-of-the-art technologies to define this type of component; moreover, it is also intended that both said liner and the corresponding outer shell made of composite material be cylindrical in shape, although obviously this simplification is made with the single purpose of facilitating this description, since the tanks that can take advantage of the present invention may be manufactured in any convenient shape or geometry.

In order to build large-sized vessels with operating pressures of 300 bars or more, without leaks, with minimum weights, maximum internal dimensions and minimum costs, it is necessary, according to our line of reasoning, to use a metal liner, reducing as much as possible both the thickness of the composite (preserving the adopted safety coefficients) and the thickness of the liner walls, whilst avoiding the danger of buckling, especially when the liner is very thin and the compressive stress to which it is subjected is very high.

In some cases, transportation of compressed natural gas (CNG) poses the problems of tensile corrosion and embrittlement from nascent hydrogen. The most suitable materials in this case are certain aluminium alloys and austenitic stainless steels, which are very resistant to almost all chemical aggressions. The latter, below 50° C., are capable of fair resistance even to attack by Cl-ions, i.e. in the presence of seawater.

With reference to FIG. 1, which shows the form of the elasticity curve for various types of steel, commonly used in the art, which have previously been subjected to work-hardening treatments, i.e. elongation under load: it is entirely evident that these curves can vary greatly from each other, and that this difference results not only from their nature, which is obvious, but also, to a significant extent, from the extent or depth of the work-hardening treatment posited.

Figure 3:
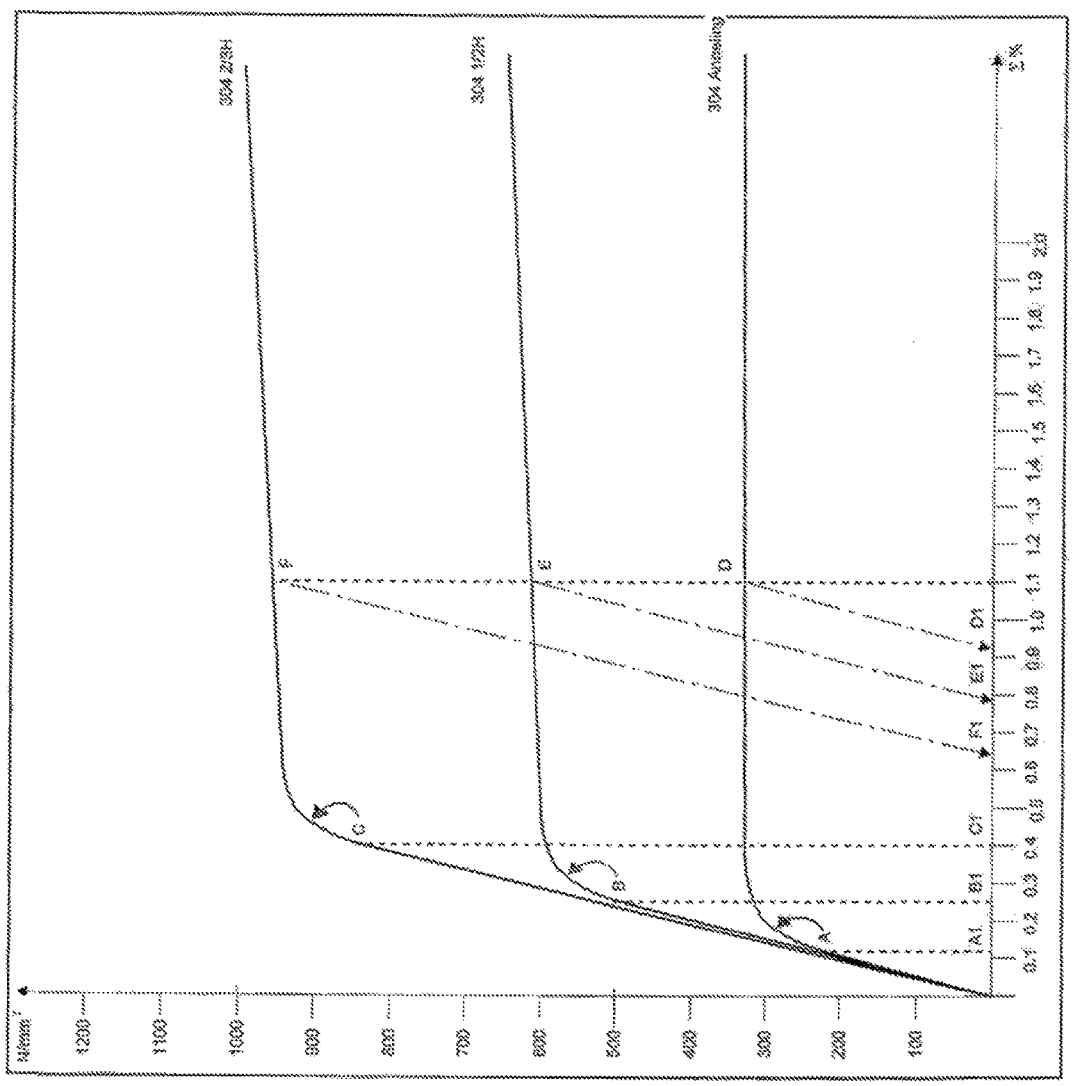
FIG. 3 shows a simplified outline of the experimental form of such material subjected to different work-hardening conditions.

With reference to FIG. 3, it can be observed that, if points A, B, C are considered, which identify the condition of the respective material in which the transition from the range of elastic behaviour to the range of plastic behaviour (i.e. permanent deformation) occurs, these points are located at respective and different x-coordinates, i.e. with respective and different values of elongation ε (horizontal axis). Observing said curves it can be noticed that, as the degree of work-hardening increases, the elasticity range increases, i.e. the elastic-range deformation increases before it reaches the plastic range.

With reference to FIG. 2, if we observe an enlargement of a schematic graphic reconstruction of two such curves, with reference to a particular type of steel, we can better observe the situation described above.

Curve "H" represents the elastic form of a base steel in the annealed state, and curve "K" represents the elastic form of the same type of steel, though previously work-hardened to an intermediate value (hereinafter conventionally referred to as ½H).

As can be noticed, in order to reach residual deformation ε, i.e. a permanent deformation, after the tensile stress has been removed, equal to 0.2%, located at point "D1" on the X-axis (conventional yield strength), a deformation of approximately 0.37% (point "D2") must be applied on the base, unhardened material.

If, on the other hand, the same material is previously work hardened, in order to achieve the same residual deformation, an elongation of almost 0.65% must be imposed, corresponding to point "D3" on the X-axis, i.e. a considerably higher value.

As regards the behaviour of said materials after removal of the stress, and especially the return from point "D2" to point "D1", and the analogous return from point "D3" to point "D1", this is common knowledge, well-known in the art, and will therefore be omitted for brevity.

The austenitic stainless steels, and particularly AISI 304, possesses, in addition to properties of resistance to chemical attack and excellent weldability, certain particular mechanical characteristics that make it suitable for use in the manufacture of liners for vessels destined to be subsequently wrapped with one or more layers of composite material. In fact, this type of austenitic stainless steel, if subjected to work hardening, radically modifies its mechanical properties.

As shown in FIG. 3, which represents schematically the experimental curve of this material subjected to various work-hardening conditions, it can be observed that, starting from the material in its annealed or solubilized state (lower curve), if the base material is subjected to three different rates of work hardening (1/4H; 1/2H; 2/3H), increasingly higher levels of embrittlement and breaking loads are obtained, while the material maintains a conspicuous reserve of residual plasticity.

In the case of the curve identified as "2/3H", there is an elongation at fracture of around 10%, i.e. similar to ordinary low-alloy carbon steel, not work hardened.

Going back to FIG. 2; following the same line of reasoning as described above, if we wanted to achieve a deformation in the range of 1-1.1% under load (this 1.1% value is the value of point D4 on the X-axis), we would have two "potential" residual deformations, depending on whether the steel has been previously work hardened or not, and exactly:

of approx. 0.92% (point "D5"), for the base, non-work-hardened material, and of approx. 0.64% (point D6) for the work-hardened material.

In essence, and to make it brief, it can now be verified that the distance between said points D5 and D6 represents the "gain", i.e. the advantage of the work-hardening treatment, which consists in lower residual elongation of the steel previously subjected to work-hardening, compared to base steel (the X-axis value of D6 is 0.64%, lower than the value of D5, 0.92%).

This property, i.e. the markedly reduced residual deformation, together with the elongation method to which the material has been subjected, combined with the substantial constancy of the breaking load, is the basis for the present invention.

In fact, the gist of the invention is based on the observation that the deformation of 1-1.1% under load corresponds almost exactly to the auto-frettage deformation which is normally performed on the finished vessel after it has been wrapped with the composite material, and which we naturally wish to impose on the liner as well.

However, if a vessel, manufactured using a type of steel like the one specified, is previously work-hardened to a significant degree (FIG. 2, curve "K") before being finished with a conventional wrapping of composite material, when the auto-frettage pressure is released the tensional state of the composite will be lower, due to the lower permanent deformation of the underlying liner, than it would be if said work-hardening method was not carried out. Consequently, also the degree of compression sustained by the walls of the liner will be considerably reduced.

By suitably calculating the thicknesses of the liner and the composite, by combining different types of fibers in order to obtain appropriate moduli of elasticity, and by subjecting the steel of the liner to a suitable work-hardening treatment before proceeding with the wrapping and auto-frettage method, it is possible to obtain a vessel characterized by minimum weight and cost with maximum payload, all other conditions remaining equal (i.e. same operating pressure, coefficient of safety and external dimensions). Finally, also by means of suitable work-hardening of the liner steel, before proceeding with wrapping the liner and performing the auto-frettage, we can impose such a state of compression on it that the mean a is as close as possible to zero in order to increase the fatigue life of the liner.

In practice, still with regard to FIG. 2, it will now be evident that, having defined a particular value of residual deformation (point D6), the present invention enables us to identify and execute the work-hardening/pre-tensioning method so as to obtain the required elasticity curve and so that, during a subsequent auto-frettage treatment, the steel is in a desired condition.

In brief, the work-hardening condition to be performed on the steel is "constructed" going backwards, according to both the elasticity curve and the subsequent auto-frettage method. The latter, in fact, enables the selection of the optimum point of residual deformation D6, from which point D4, and therefore the value of the work-hardening to be performed on the material, is calculated.

As an alternative to the solution described above, of a preliminary work-hardening of the liner, the thickness of the liner should be increased, all other conditions remaining equal, in order to reduce the specific loads and therefore the elongations. However, this solution, i.e. increasing the thickness of the liner, is exactly what we wish to avoid.

The present invention solves this problem by devising a tank equipped with a conventional liner which, before being wrapped with the layer of composite material, is subjected to a treatment consisting of work-hardening/dilation of the relative exterior wall, which should preferably be cylindrical in shape.

This dilation method is to be performed according to the traditional method, i.e. by letting a fluid, preferably a liquid, inside the liner, and subjecting this liquid to a very high pressure, so as to deform the cylindrical surface of the liner, expanding it circumferentially and axially; in practice, both the diameter and the length of the basically cylindrical liner are expanded.

By this means the internal volume is obviously significantly increased, without however increasing the mass, and therefore the weight, of the liner. Which is one of the results that we wish to obtain.

According to the invention, this result can be obtained by means of the following procedures and methods:

First of all, for the manufacture of the liner it is necessary to select and use a steel featuring the most ductile possible behaviour, i.e. in which elongation at fracture can reach as high as 50%.

This requirement is due to the above-mentioned need, i.e., the metal of which the liner is made should be able to expand/dilate to a large extent while maintaining a sufficient reserve of deformability, and remain within a deformation range which is very far from the point of fracture, thus avoiding embrittlement phenomena that would adversely affect fatigue life;

Secondly and concurrently, during this expansion method the material must be enabled to achieve a suitably work-hardened condition, in order to increase its elastic range uniformly and in both directions (axial and circumferential).

Indeed, it is necessary to observe one of the fundamental conditions of this invention, i.e. that, with the expansion/dilation stage described above it is still possible to stretch the liner for a limited but additional yield interval; this method must be executed during a subsequent auto-frettage stage, after the vessel has been completed and wrapped with a layer of composite material. By this means, after the composite material has been applied, during the auto-frettage stage, it will be possible to calibrate the permanent deformation on the walls of the liner (in order to reduce it) so that, when the auto-frettage pressure is released, the composite material does not excessively compress the metal of the liner walls, thus preventing the risk of buckling mentioned above.

All this is valid mostly for vessels under pressure subjected to low temperatures, where the liner suffers an additional contraction.

In order to obtain this situation, it is necessary to choose a type of steel that can be strengthened (i.e. work hardened) up to a pre-determined value. This value must be such that, after the liner thus deformed has been overwrapped with an ordinary conventional layer of composite material, the common operating point of the curve of the respective modulus of elasticity, after auto-frettage, under operating conditions, satisfies both of the following conditions:

the two materials, steel and composite, must both be within the range of their respective elasticity curve, also during the hydraulic certification test, where the value may reach up to 150% of the value of the operating pressure;

after the subsequent auto-frettage method, and under operating conditions, the operating point of both materials comprising the wall of the tank, including both the liner and the layer of composite material, is found:

for the liner, before the yield strength level, and more conveniently with a mean stress value $\sigma$ such that the tensioning $/\sigma/$, at the operating pressure, minus the compression $/\sigma/$ when the vessel is empty, is as close as possible to 0;

for the composite material, at the operating pressure, the $\sigma$ must remain within the limits imposed by the adopted safety coefficient.

Figure 4:
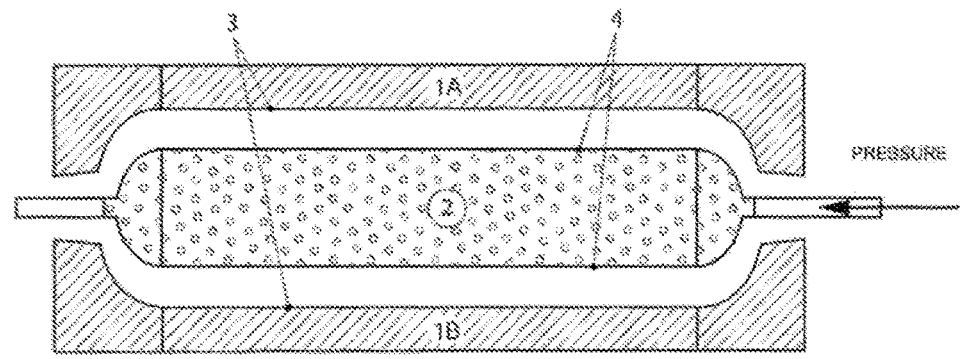
FIGS. 4A, 4B and 4C show some extremely simplified and symbolic outlines of as many operating states of a liner pre-tensioning mould according to the invention.
Figure 4:
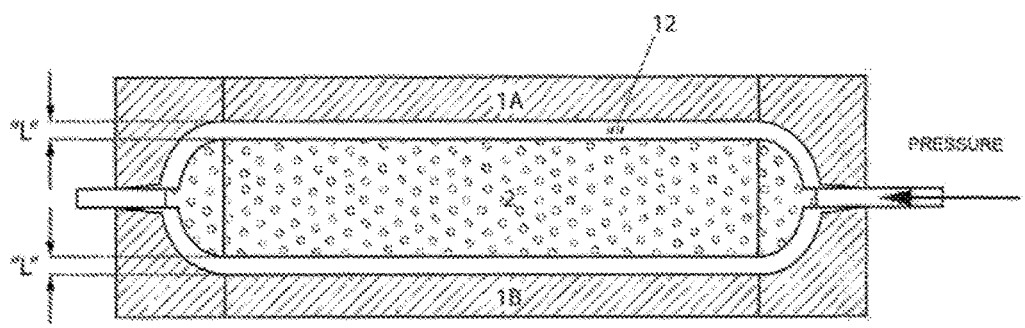
Figure 4:
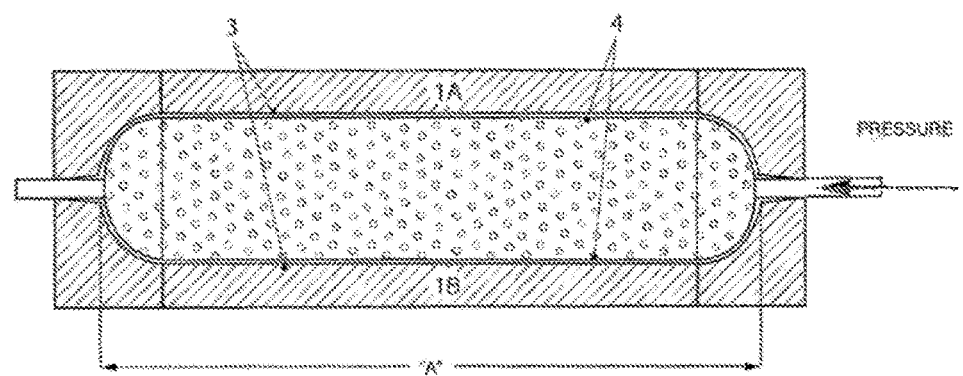

According to the invention, with reference to FIGS. 4A, 4B and 4C, this pre-tensioning treatment, designed to cause the liner steel to expand/dilate, is carried out using an external mould 1, of cylindrical shape if the liner is basically cylindrical, of such dimensions as not only to completely enclose liner 2, but also to ensure that an interval of linear and radial dimensions "L", substantially constant throughout the cylindrical surface of the liner, remains between the inner walls 3 of said mould 1 and the outer surfaces 4 of the liner.

In practice, the outer mould 1 and liner 2 have basically coaxial cylindrical geometries, featuring a similar height "A", centered so that the internal geometry, that of liner 2, is completely lodged within the external geometry, determined by inner wall 3 of mould 1.

Between these two geometries, of liner 2 and of inner wall 3 of mould 1, a hollow space 12 is thus created, basically ring-shaped and elongated.

The invention method consists in performing said liner pre-tensioning treatment, before the liner is wrapped with the composite material, according to the following successively-ordered stages:

a) lodge steel liner 2 within mould 1, (as regards the criteria for identification of the ideal type of steel, the subject is dealt with below), (FIG. 4A);

b) completely close the two halves, 1A and 1B, of the mould 1, so that they define cylindrical mould cavity capable of encasing liner 2 (FIG. 4B);

c) close the liner access hatches (the liner may have one or more hatches, but this feature is not essential to the procedure);

d) insert a fluid in the liner, capable of being pressurized; this may be any fluid suitable for the purpose, but for both technical and economic reasons it is much better to fill the liner with a liquid, which may be oil, for instance, though water is preferable, being more economically advantageous;

e) pressurize said fluid until the walls of the liner, particularly its entire cylindrical surface, are dilated and extended to the point where they encounter the inner cylindrical surface of mould 1, which blocks the dilation of the liner (FIG. 4C).

In practice, a method conceptually similar to the "blowing" method universally used, for instance, for blow-moulding plastic bottles (PET) for domestic use, or to the well-known technical method of hydroforming;

f) after the liner has reached this stage, it is depressurized, the mould 1 is opened and the liner is extracted from the mould to be subjected to subsequent treatments as described below.

At this point it is apparent that, if the elongation (or expansion, depending on which measurement is taken into consideration) has reached a point where it is, even barely, within the metal's yield strength range, a liner will have been obtained featuring not only a yield-strengthened outer cylindrical surface (work-hardened steel), but also a significant expansion of its internal volume, passing from value (just for the cylindrical part):

$$V1 = a \cdot \pi \cdot r2$$

to the new value:

$$V2 = a \cdot \pi \cdot (r+L)2$$

where r represents the initial radius of the cylindrical liner, and a represents the height, or length, of the cylindrical surface.

As mentioned above, L represents the linear distance between the surface of the liner and the inner surface 3 of mould 1 before dilation/expansion. It is therefore evident that the internal volume of the tank can be increased, even by a significant amount, without at all increasing the quantity, i.e. the weight of the material utilized, and therefore the cost, either direct, i.e. the manufacturing cost, or indirect, i.e. the transportation cost.

The means and methods adopted to perform the work-hardening method described above can be advantageously improved on the basis of the following consideration:

it is well known that, during the method of introducing a fluid (in our case a liquid) into a closed vessel (in our case a liner), where the pressure inside said vessel increases rapidly to a very high value, while the pressure exerted against the outer walls of said vessel (in our case inside the ring-shaped cavity 12 created between the inner walls 3 of said mould 1 and the outer surfaces 4 of the liner) remains basically constant, at a value progressively lower than the value of the pressure inside the liner, an unwanted irregular deformation may easily occur (like a "bubble") on the surface of said liner.

This phenomenon may easily also cause an irregular final deformation of the liner itself, with consequent irregular work-hardening, whereas the present invention is based on the regular advancement of the work-hardening method.

To avoid this risk, the proposed improvement teaches how to introduce in said cavity 12 a fluid, preferably a liquid, that completely fills said cavity 12 and that is pressurized to an adjustable, progressively increasing counter-pressure.

Said counter-pressure in said cavity must increase as the pressure inside the liner increases, specifically the Δ pressure against the two walls of the liner must advantageously remain constant or semi constant, to ensure that the deformation of the liner occurs in a uniform manner:

both over the entire extent of the liner, and over time, i.e. there are no different pressure peaks during the liner pressurization stage (work-hardening).

This method, of itself, is within the scope of industry experts, therefore the details of execution are omitted for brevity.

Figure 5:
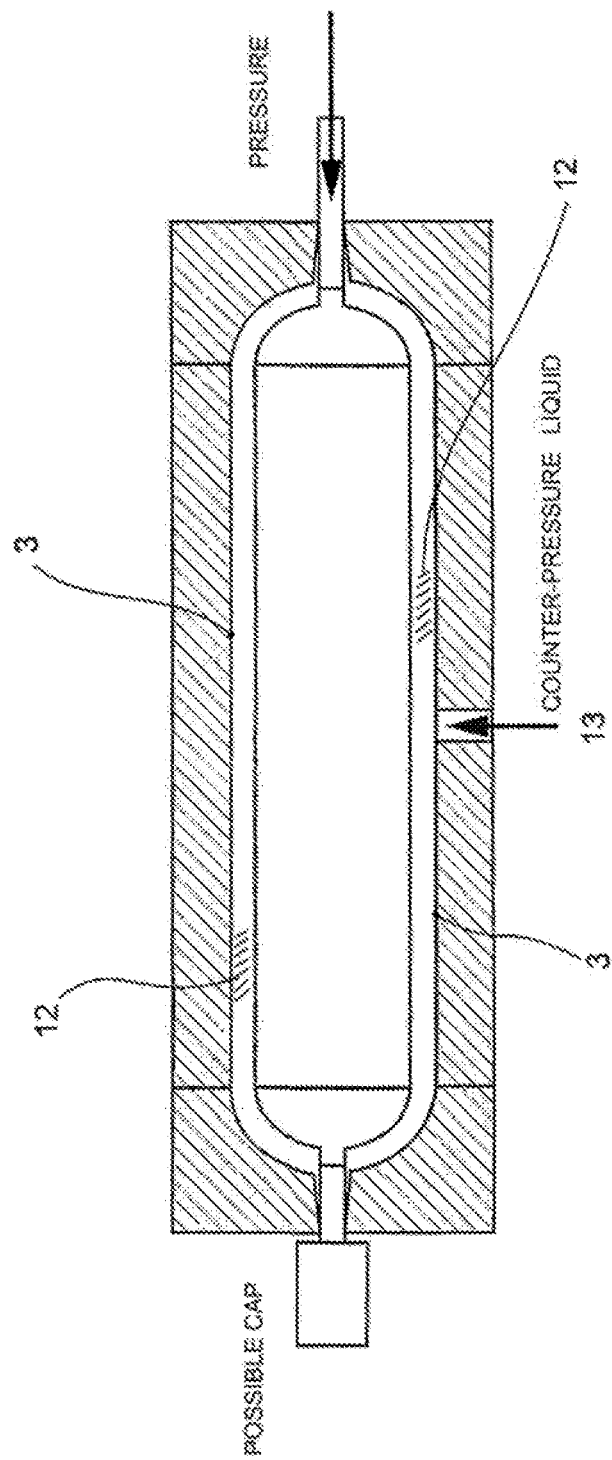
FIG. 5 shows a modified and functional version of a liner dilation method with respect to FIG. 4B.

However, it is convenient to point out here that, with the present improvement, and with reference to FIG. 5, in the body 1B of the mould, a channel 13 must be provided in order to enable the introduction into said cavity 12 of fluid at the required counter-pressure, to be adjusted according to the pressure increase inside the liner.

Now observe FIG. 3, which shows three curves C1, C2, C3, each of which represents a respective elasticity curve possible for a single liner, manufactured using the same material, in which each curve represents the degree of work hardening that can be obtained using 3 different moulds of different dimensions, where curve C1 represents the load curve that can be obtained with the least elongation of the material, and C3 represents the load curve that can be obtained with the utmost elongation of the material.

In order to avoid any misunderstanding, the method can be exemplified as follows: if three completely identical liners are made, using the same type of material as well as having the same dimensions, and if said liners are subjected to the method described above, using, however, three moulds differing from each other only in respect to the size of "L", i.e. the width or radial length of the initial cavity between the liner and the inner surface of the mould, the 3 curves described above can be obtained, where each curve shows the load curve of each liner after the respective pre-tensioning or work-hardening treatment described above.

Therefore, based on the nature and thickness of the composite material, on the characteristics of the auto-frettage method, and on the operating pressure, the curves shown in FIG. 3 allow us to identify, for each type of steel, the degree of work-hardening required in order to satisfy those requirements.

In brief, the intersection of a given σ and a particular ε identifies, for each type of material, a respective curve and therefore a respective degree of work hardening, and consequently, a respective size of mould to be used.

As regards the method and means to be used in order to perform the pre-tensioning/work-hardening treatment described above, the experienced reader will have observed that said work-hardening cannot be obtained with a single undifferentiated dilation of the walls of the liner, since the latter consists, more or less, of a central cylindrical surface and two hemispherical end surfaces.

Therefore, considering the different degree of resistance provided by these different surfaces, the simple introduction of pressurized liquid inside the liner, without any further measures, will inevitable produce a differentiated work-hardening/deformation on the different parts of the liner walls, and therefore an acceptable and optimal deformation on part of the surface, but not an optimal one on the remaining part.

In order to overcome this drawback, the liner is subjected to a work-hardening method featuring two subsequent stages, where:

during the first stage, an initial portion of the liner is dilated/work-hardened, while ensuring that the other portion is artificially protected and blocked so that it does not suffer any stress from the related dilation, subsequently, a second stage is carried out, where the above operations are inverted, i.e. the first, previously work-hardened part of the liner is blocked and kept from dilating, while the second, not yet work-hardened part is subjected to the deformation treatment.

With reference to FIGS. 6 to 9, an initial mould 20 is prepared for this purpose, having such profiles and overall dimensions that, when it is closed around liner 2, as shown in FIG. 6, the two parts 20A of the mould, which face the hemispherical end portions 2A of liner 2, present the same longitudinal dimension "M" as the respective said hemispherical end portions 2A of liner 2.

The cylindrical portion of the liner, moreover, presents a first internal dimension "D-1". Unlike said cylindrical portion, the cylindrical part 2B of the liner takes up a position at a distance "D-2", corresponding to the final deformation required.

Thus enclosed, the liner is next subjected to the necessary internal pressure until the cylindrical portion 2B of the liner expands to a point where it comes into contact with the opposing cylindrical surface 20B of the mould, thus achieving the final radial dimension desired.

After said initial deformation stage, the liner takes up the shape shown in FIG. 7, where the final shape of the cylindrical surface portion of the liner is identified as "20C"; in this condition the diameter "D3" of said cylindrical portion will obviously correspond to the sum of the initial diameter "D-1" and double said distances "D-2".

In this initial stage the hemispherical portion 2A of the liner is modified only marginally, as its longitudinal dimension "M" remains blocked by said surface portions 20A of the mould, whereas the two related perimeter portions are forced to follow the dilation of the cylindrical surface portion of the liner up to said dimension "D3".

Subsequently, the liner is extracted from mould 20 and introduced into a second mould 30, as shown in FIG. 8, which presents a cylindrical surface of such dimensions that, when said mould 30 is closed around the liner previously method as described above:

said cylindrical surface 20C, already deformed, adapts perfectly and abuts the inner surface 30A of said second mould 30, while the hemispherical end portions 30B of the second mould take up position at a pre-determined distance "P" from the corresponding hemispherical surfaces 2A, not yet deformed, of the liner.

At this point, the inside of the liner is again pressurized in order to bring said hemispherical surfaces 2A back into contact and abutment with said hemispherical end portions 30B of the second mould 30.

At the end of said second dilation/work-hardening stage, the liner will be as shown in FIG. 9, i.e., in brief, it will present a diameter of the cylindrical portion equivalent to said "D-3", and a total length "LT" (see FIG. 9) equivalent to the original length "LO" of the liner (see FIG. 8) increased by twice said pre-determined distance "P".

In conclusion, at the end of said second stage the entire liner is deformed throughout in the desired manner, i.e. with differentiated deformation radiuses and even deformation pressures, intentionally designed to achieve a pre-determined overall deformation/work-hardening.

As regards the materials to be used, the most suitable types are the austenitic stainless steels, including the duplex-type ones; more specifically, the best steel identified for this purpose is AISI 304, preferably in its more weldable AISI 304L version, characterized by a very low carbon content.

The term "duplex steel" identifies a type of high-resistance austenitic stainless steel, well known in the art by that name, therefore its specific characteristics are omitted here for brevity.

The above-described methods have been experimentally shown to be entirely suitable for the purpose of achieving the goals of the invention; however, it has also been ascertained that significantly improved method results can easily be obtained by using steel, of the type specified above, which has previously been subjected to two specific thermal treatments:

the first thermal treatment is "solubilization", i.e. the diffusion of carbides in the austenite; this treatment is performed in order to obtain a softer, more ductile alloy, therefore more easily worked;

the second treatment, annealing, consists of heating the steel to a temperature which is lower than the melting temperature, followed by a stage of slow and/or controlled cooling; this second thermal treatment is performed in order to eliminate the internal residual stresses and to cancel the effects of plastic deformation, which may have been caused by previous weldings or thermal treatments which may have produced localized internal stresses.

As such solubilization and annealing treatments are well known and widely used in the art, a detailed description of them is omitted.

Finally, it is also necessary to consider whether it might be more advantageous to execute said thermal and mechanical treatments, particularly work-hardening/pre-tensioning, not on the liner already formed as a semi-finished tank (lacking the final wrap of composite material), but rather on the single sheets of metal which must inevitably be welded together in order to produce the liner.

Indeed, carrying out the work-hardening/pre-tensioning treatment on the single metal sheets, before they are welded together to form the liner, saves money and improves efficiency and productivity, especially as it circumvents the need to provide extra-large moulds to carry out the work-hardening method described above.

The possibility of work-hardening the single metal sheets before they are welded together is a well-known procedure in the art, making use of a two-dimensional type cold-rolling method which is performed in two separate stages on the same metal sheet, so as to ensure controllable and uniform work-hardening throughout the surface of the sheet.

As the method of work-hardening each single metal sheet by cold rolling in two or more stages is well known in the art, it is not described here in detail.

In essence, the invention method makes it possible:

to dilate/work-harden the external part of the liner so as to obtain the desired substantial increase in the internal volume of the tank, of which the liner constitutes the inner sleeve, without increasing the thickness, but on the contrary reducing it, and therefore keeping within acceptable limits the weight and cost of the liner itself, simultaneously, to carry out said dilation using such methods and materials that the dilation obtained does not negatively affect the objectives of the subsequent auto-frettage treatment, i.e. it remains possible to subject said pre-stressed (therefore pre-dilated) liner to a conventional auto-frettage treatment, naturally, after said liner has been wrapped with a conventional layer of composite material, well-known in the art, while it remains still possible to carry out a second tensioning of the entire tank in such a way that the liner, after said second auto-frettage tensioning, still retains the capacity of contracting by a certain amount, due to the elastic behaviour it still possesses thanks to the characteristics of the material used, without, however, entering the elastic instability range with the consequent risk of buckling.

Moreover, the pre-tensioning treatment described above offers additional advantages, in that any defects in the metal structure of the liner are immediately made evident; in particular, a seal test is thereby carried out, and any flaws in the liner's welds are automatically identified.

Proceeding with the manufacture of the tank, at the end of said separate method of pre-tensioning the liner, the latter is wrapped with one or more layers of suitable composite material, and the tank, thus completed, is subjected to an auto-frettage treatment, which can consequently be carried out without compromising the tank's characteristics, enabling the desired pre-compression of the liner, which allows for the introduction of gas at high pressure with the result that the liner abandons the state of pre-compression, goes through a state of zero compression and finally reaches a normal tensioning state, but with a tension value that is reduced, even by a large amount, as compared to the state it would be in if the auto-frettage treatment had not been carried out.

In the method of constructing prototypes and experimenting with them in a real environment, in order to verify the consistency of the evaluations and invention hypotheses described above, and considering moreover additional elements that are, of themselves, well-known in the art, further improvements in the method of constructing the liner and corresponding tank have been identified and are described hereunder:

A). The first of such improvements is due to the fact that, after the previous work-hardening treatment by means of pre-tensioning, the wall thickness of the liner is distinctly thinner compared to its thickness before work-hardening; indeed, this is exactly what was meant to be achieved by means of said work-hardening. However, this treatment, in addition to the advantage just described, also entails the well-known drawback of making the liner more vulnerable to the buckling effect, i.e. the bending inwards, arch-wise, of the liner wall, after the layer of composite material has been wrapped around it.

This risk of buckling results from the fact that, after the above-mentioned auto-frettage, said layer of composite material is still within its elastic range and therefore exerts a significant, continuing inward radial compression force on the underlying liner. In order to avoid this dangerous situation, it has been found experimentally that, if the outer wall of the liner, originally cylindrical in shape, is formed so that it acquires a corrugated or ridged and furrowed appearance, featuring a series of parallel furrows as shown in FIG. 10, it offers considerably enhanced characteristics of resistance to budding compared to the initial liner, before said forming.

Indeed, with reference to FIGS. 9 and 10 which show, respectively, a liner before corrugated forming and the same liner after said forming, repeated experiments have shown that the propensity for buckling of the outer wall of the liner decreases significantly after said outer wall has been furrowed/corrugated, in comparison with the prior condition in which said wall was basically cylindrical, not furrowed/corrugated. It should immediately be made clear, however, that this corrugation of the liner must not be performed after the latter has been subjected to the work-hardening treatment, which has been extensively described above, but in the course of said work-hardening treatment.

With reference to FIG. 11, said work-hardening treatment must therefore be carried out using appropriate moulds whose inner surfaces, that encase and shape the outer lateral surface of the liner, feature corrugations numbered 40, 41, 42, 43 . . . respectively; these corrugations are arranged ringwise in the shape of ridges and furrows lying on respective planes orthogonal to the axis of the liner, therefore they are designed as a mirror image, "in reverse", of the corresponding corrugations 40B, 41B, 42B, 43B . . . that one wishes to obtain on the lateral wall of the liner itself.

In fact, a sort of hooping of the initially cylindrical liner is thus obtained; as explained above, the purpose of this hooping is to increase, and therefore considerably improve, the inward radial rigidity of the liner, thus reducing the risk of bucking, without adding new material or executing additional methods in order to apply the "hoops" by means of which said hooping is achieved.

The purpose of hooping, in general, is to increase the resistance of structural elements having an annular cross section, subjected to radial stress exerted inwardly; it basically consists of a continuous or discontinuous wrap using a suitably strain-resistant material.

With reference to FIG. 11, hooping of a different shape is shown, where the longitudinal axial cross section of the liner shows that the hooping ridges consist basically of the outer bands 40C, 41C, 42C . . . having the shape of respective isosceles trapezoids, whereas, specifically, such "hoops" consist of the cylindrical outer profiles 40D, 41D, 42D . . . .

In the case under consideration, the presence of such corrugation, however it is obtained, equivalent to "hooping", offers the advantage that, the weight of the liner being equal, its resistance to deformations from pressures exerted inwardly from the outside is significantly increased; by these means, an additional limited amount of work-hardening could be carried out on the liner, resulting in additional limited reduction of the thickness, i.e. the weight, of the liner wall.

It will immediately be apparent that this opportunity has enormous relevance in the present circumstances, where the main purpose of the invention is specifically aimed at reducing the weight of the liner and respective tank, all other conditions remaining equal.

It has also been observed that, within certain limits, the size of depth "H" of said corrugation/hooping improves correspondingly, and therefore progressively, though not linearly, the outer resistance of the related liner; this circumstance can be used to determine the depth of the corrugations/hoops according to the degree of resistance one wishes to obtain from the liner, with regard to the internal radial stresses caused by the pressure exerted by the fluid content.

Finally, an advantageous combination of ratios has also been observed between the dimensions of a liner subjected to a corrugating/hooping method as described above; with reference to FIG. 14, in fact, it has been experimentally shown that the ratio that offers the best operating results, of width "L" of each single furrow to its height or depth "H", i.e. the ratio L/H, lies within a range of 1 to 6, i.e. $1 \leq L/H \leq 6$.

Moreover, additional ranges have been identified in the ratios between the various dimensions of the liner where said corrugations have been formed; such ranges, when verified individually or in combination, enable a significant improvement in the main performance of the liner, i.e. its resistance to radial dilation while in operation.

The ratios are:

$$3 \leq L/Re \leq 15,$$

$$3 \leq L/Ri \leq 15,$$

$$20 \leq R/H \leq 100,$$

where the symbols utilized are illustrated in FIG. 14; in particular:

Re represents the bending radius between the flat, uncorrugated portion 50 of the liner surface, and the contiguous inclined side 51 of the adjacent furrow 52, Ri represents the bending radius of the curved lower vertex Vi between the two contiguous inclined sides 51 and 53 of the same furrow 52.

Moreover, it has also been experimentally shown that the optimal ratios of radius R (see FIG. 14A) to thickness "S" of the corrugated wall lie within the following range:

$$100 \leq R/S \leq 1250.$$

Even more specifically, it has been found that, for minimum values of "H" with respect to width "L" of the furrow (see above relation $1 \leq L/H \leq 6$) where L/H is about equal to 6, that is L/H≈6, even better results can be obtained if R/S is about equal to 100, that is:

$$R/S \approx 100.$$

If it should be, on the other hand, that L/H≈1, then the best conditions can be obtained if it is established that R/S≈1250.

The preceding relationships have to be intended in approximate meaning, in the sense that they explain the fact that, other conditions and especially the liner features being unchanged, the height "H" of said furrows 40B, 41B, 42B, 43B . . . has to be, even in a non linear way, inversely correlated to the liner diameter, i.e. the larger is the liner thickness "S", the less has to be the height "H" of said furrows 40B, 41B, 42B, 43B . . . .

Therefore, the present improvement offers a double advantage:

on the one hand, liner resistance to outward deformation is significantly increased, and this advantage is used by correspondingly, though not linearly, reducing the weight of the liner itself, so as to return to the original value of pre-defined resistance;

the second advantage consists in the fact that, since said corrugation/hooping method is carried out directly by means of moulds, no special hooping devices need to be manufactured, therefore any extra work/operation in connection with the assembly of such devices is avoided.

Industry experts must surely have instantly realized that such technical advantages translate immediately into sizeable economic advantages, considering the greater efficiency provided by said types of liners, both as regards performance and manufacturing techniques.

B) With reference to FIGS. 12 and 13, the following improvements have been devised and are described hereunder:

Please observe FIG. 12, which represents, schematically and symbolically, the curve of the modulus of elasticity, i.e. the shape in the Cartesian plane "ε", "σ" of the curves representing the behaviour of the following three materials:

AISI 304L stainless steel, whose Modulus is approx. $E \leq 190.000$ N/mm$^2$, carbon fibre, fibreglass, whose Modulus is approx. $E = 160.000 \div 115.000$ N/mm$^2$, continuous fibreglass, whose Modulus is approx. $E = 40.000 \div 55.000$ N/mm$^2$.

The following considerations come to mind: let us suppose that, after the work-hardening or pre-tensioning method has been carried out on the liner, the latter is wrapped with a composite layer of continuous fibreglass and carbon fibre, according to the art. In these conditions, when the tank has been completed and has been put into operation, i.e. pressurized under high pressure of about 300 bar or even higher, the consequent radial expansion of the tank is transmitted identically to the radial expansion of the two materials that form the composite layer of fibreglass and carbon fibre. And because the liner is circularly wrapped with said fibres, this radial expansion is transformed into a corresponding and identical longitudinal extension of the same fibres.

However, the two components of said composite layer, continuous fibreglass and carbon fibre, behave differently with regard to said identical longitudinal extension.

With reference to FIG. 12, it can be observed that, at the same dilation value "ε1" of the two composites of fibres under discussion, their reaction is significantly different; in fact the composite of fibreglass reacts with a stress value "V1", whereas the composite of carbon fibre reacts by producing a stress value "C1", which, considering the difference between the respective modulus of elasticity, is significantly higher than "V1".

This means that the expansion stress of the liner is transmitted in a very unbalanced manner to the two components of the composite wrap, and more precisely, the greater part of the stress is counteracted by the composite of carbon fibre, at point "C1", while the composite of continuous fibreglass is subjected to far less strain, reaching point "V1".

It should therefore be possible, as an initial hypothesis, to simplify the entire method of manufacturing the wrap by entirely eliminating the fibreglass, which does not perform or underperforms, and by using exclusively the carbon fibre.

However, this hypothetical solution is entirely unacceptable from an economic standpoint, for the simple obvious reason that carbon fibre is far more expensive, up to approximately 8-10 times more expensive than the same weight amount of fibreglass; this factor eliminates the possibility of using composite of carbon fibre alone.

As an alternative, opposite hypothesis, it could then be decided to use composite of fibreglass alone, employing a greater quantity of it, sufficient for the purpose; also this hypothesis, however, must be rejected, as it runs up against the fact that continuous fibreglass is much heavier than carbon fibre, and much more so if we consider that the amount of fibreglass that would be required in order to withstand the dilation pressure of the liner must be far greater, considering the significant difference between the two moduli of elasticity. This limitation is totally unacceptable for the simple fact that the entire purpose of the present invention is to create complete tanks, which while providing the same level of performance, weigh far less than the tanks produced according to the known art, and not more, as would be the case if continuous fibreglass alone were to be used.

The technical-economic situation has been analysed in all its aspects, and a method has been identified which enables the achievement of the optimum compromise in the manufacture of the complete tank, from the standpoint of its overall costs and final weigh.

The solution is described as follows: with reference to FIG. 13, after it has been subjected to the work-hardening treatment described above, the liner, having returned to a state of rest, is initially wrapped with a single and relatively light-weight layer of composite of fibreglass, after which it is subjected to an auto-frettage treatment according to the art.

When this treatment has been completed and the liner has again returned to a state of rest, the situation is as follows: in FIG. 13 the layer of fibreglass is in the condition featuring a positive value "σv", since the latter material has always remained within its elastic range and, after the auto-frettage treatment, has almost returned to the original condition, from the standpoint of its deformation "ε", despite being strained in extension by the underlying liner.

The liner, on the other hand, being strained in compression by the overlying composite of fibreglass wrap, is in the condition represented in FIG. 13 by point "σa", i.e., it is in a condition of negative strain (compression), but without actually presenting any significant deformation (the x-coordinate of point "σa" is basically zero).

At this point, after the previous auto-frettage treatment with the composite of fibreglass alone, the liner is wrapped with an additional and final layer of carbon fibre placed over the layer of fibreglass.

This final wrapping is performed in a neutral manner, i.e. without any stretching or straining of the composite of carbon fibre, which is represented by point "σc" in FIG. 13, obviously at the "0" (zero) point, since it is not subjected to any strain and therefore does not suffer any deformation.

Therefore, in this final condition the complete tank is made up of the following three components:
  the steel of the liner, represented by line "A",
  the composite of carbon fibre, placed externally and represented by line "C",
  and the composite of glass fibre, placed intermediately between the previous two layers, and represented by line "V".

When said tank is put into operation, i.e. is pressurized, the operating conditions change, obviously, and the parameters of the chosen materials can be adjusted in such a way that the new operating conditions are such that the representative points of the conditions of the two fibre wrapping materials, along the respective lines "V" and "C", lie approximately within the same range bound by the closed line "Z". Said closed line then represents a zone of possible working of the two considered composite materials.

It is therefore evident, in this case, that the desired condition is obtained, i.e. that when the strain on the steel of the liner becomes zero, and is found at point "A1", because previously it was under compression, i.e. with negative "σa", then the strains along the vertical axis of "σ" on the two types of wrap, the fibreglass and the carbon fibre, take on a similar value; which demonstrates that the dilation strain of the underlying liner is compensated in a basically similar manner by the two different layers of wrapping fibres.

This method of forming the tank is valid in general since it prevents using quantities of wrapping material in excess of what is required from the standpoint of the respective strain. It is obvious, however, that this general design method must be fine-tuned and calibrated according to requirements, so as to cover all the possible variables that may be encountered, in particular the cost of the components, their weight, and their mechanical characteristics.

However, it has been observed that this method makes it possible to launch a project in a rational manner, since the problem of distributing the load of the liner steel in a basically similar manner on both types of wrap is solved beforehand.

The method described above for the construction of a complete tank enables an additional improvement; in fact, after the underlying liner, already wrapped with an initial layer of fibreglass, has been wrapped with the final layer of carbon fibre, it has been observed that the general operating conditions, and particularly the resistance characteristics of the complete tank, can be additionally improved if, under certain conditions, and after the tank has been wrapped with the layer of carbon fibre according to the method described above, a second, more limited auto-frettage treatment, is carried out.

This second auto-frettage treatment has the effect, known in the art, of further improving the characteristics of the tank, as it increases the initial compression value of the liner steel at rest without compromising the advantages of the previous auto-frettage treatment performed on the liner wrapped with only the first layer of fibreglass.

Finally, it must be kept in mind that the use of fibreglass has been proposed only as a typical and preferential material for any improvements of the invention; however, as every industry expert must realize, any other material possessing similar characteristics may, in principle, be employed as an alternative to continuous fibreglass.

In particular, we wish to mention that the material known as "Kevlar", which presents a considerably lower modulus of elasticity than that of carbon fibre, can be usefully employed in place of the latter.

The preceding considerations have been elaborated and presented on the base of merely technical evaluations, that is to increase at the highest degree the value of the working features of the used material.

However in the actual production environment the preceding considerations are not deemed in itself sufficient to suggest a definitive decision in the production matter; in the facts, as the purpose of the instant invention is to improve the overall final economic profit of the complete tank, in the final productive decision it cannot obviously be excluded a strict evaluation on the cost of the various components.

In such an evaluation it came up with sure evidence that the cost of the carbon fibre is hugely higher than the cost of the fiberglass, and that then the just described hypothesis of carrying out a second layer with a composite of carbon fiber requires an usage of a larger amount of the same composite, as obviously the second layer is wider than the first layer (the respective two cylindrical geometries show respectively different radiuses).

Final conclusion of this situation would be that the complete tank so produced, even if technically optimized from the point of view of the material utilization, would be not optimized from the point of view of the final overall cost.

To identify an optimum overall solution it is then here proposed the productive embodiment wherein:
  the first covering layer of the previously work-hardened liner consists of the composite of carbon fiber and epoxy resin,
  the second covering layer obviously consists of a composite of fiberglass and epoxy resin.
  Obviously what just written is valid if two different composite layers, with two different elastic moduli, are implemented.

Even in the just considered circumstance the previously offered considerations are valid, i.e. after having implemented the first layer with the composite of carbon fiber and epoxy resin, the tank so obtained is subjected to an auto-frettage method, according to the prior art.

Moreover, still as in the previous case, and based of technical-economic considerations which have to be based on each specific case, it may be advantageously be provided a further and final layer of composite of fiberglass over the first layer of composite of carbon fiber.

The invention claimed is:
1. A method for the production of a high-resistant tank, the method comprising:
  fully enclosing an essentially cylindrical liner within a mold having an inner wall that defines internally an essentially cylindrical volume adapted to house the liner, the liner being formed of a metal;

introducing into the liner a fluid capable of being pressurized;

subjecting an outer wall of the liner to axial and longitudinal pre-tensioning hardening by pressurizing the fluid until the outer wall of the liner is expanded and stretched a predetermined linear distance (L) to meet the inner wall of the mold, wherein by expanding and stretching the liner by the linear distance (L), the elastic field of the metal is changed by increasing the yield strength of the metal to a pre-determined value;

de-pressurizing an inner volume of the liner and removing the liner from the inside of the mold;

covering the outer wall of the liner with a layer of composite material so to assemble the tank; and subjecting the tank an auto-frettage treatment.

2. The method according to claim 1, wherein the metal is a steel having a high elongation before reaching the yield strength of the pre-determined value.

3. The method according to claim 2, wherein the steel is an austenitic stainless steel.

4. The method according to claim 1, wherein while subjecting the outer wall of the liner to the pre-tensioning hardening, an adjustable counter-pressure is applied to the outer wall of the liner.

5. The method according to claim 4, wherein the adjustable counter-pressure is controlled at a level so to maintain a pressure difference between the inner volume of the liner and the outer wall of the liner at a predetermined value.

6. The method according to claim 1, wherein the auto-frettage treatment is carried out in such a way that a resulting tensioning on the metal is within the yield strength field of the metal.

7. The method according to claim 1, wherein the pre-tensioning hardening is carried out after having subjected the liner to an annealing/solubilization thermal treatment.

8. The method according to claim 1, wherein the outer wall of the liner is formed with a plurality of corrugations.

9. The method according to claim 8, wherein:
the plurality of corrugations are formed, parallel to each other, during the pre-tensioning hardening, and
a ratio between a width "L" and a height or deepness "H" of each corrugation is between 1 and 6 ($1 \leq L/H \leq 6$).

10. The method according to claim 9, wherein a ratio R/S between a radius "R" of the liner and a thickness "S" of the outer wall is approximately 100 if the ratio L/H is approximately 6, and is approximately 1250 if the ratio L/H is approximately 1.

11. The method according to claim 8, wherein, for each corrugation, a ratio between a width "L" a bending radius (Re) between a non-corrugate portion of the outer wall and a contiguous inclined side of the corrugation is between 3 and 15 ($3 \leq L/Re \leq 15$).

12. The method according to claim 8, wherein, for each corrugation, a ratio between a width "L" and a bending radius (Ri) of a lower curved vertex (Vi) between two contiguous sides of the corrugation is between 3 and 15 ($3 \leq L/Ri \leq 15$).

13. The method according to claim 8, wherein a ratio between a radius "R" of the liner and a height (H) of each corrugation is between 20 and 100 ($20 \leq R/H \leq 100$).

14. The method according to claim 1, wherein the composite material has a low modulus of elasticity.

15. The method according to claim 14, further comprising, after the auto-frettage treatment:
covering the layer of composite material with a second layer formed of a material having a medium modulus of elasticity.

16. The method according to claim 15, further comprising, after covering by the second layer:
subjecting the tank to a second auto-frettage method treatment.

17. The method according to claim 14, further comprising:
covering the layer of composite material with a second layer comprising a material having a low modulus of elasticity.

18. The method according to claim 1, wherein the composite material has a high modulus of elasticity.

* * * * *

UNITED STATES PATENT AND TRADEMARK OFFICE
CERTIFICATE OF CORRECTION

PATENT NO.        : 10,072,797 B2
APPLICATION NO.   : 15/110859
DATED             : September 11, 2018
INVENTOR(S)       : Giovanni Fratti Page 1 of 1

It is certified that error appears in the above-identified patent and that said Letters Patent is hereby corrected as shown below:

On the Title Page

In item (71), "C.N.G.V.d.o.o" should be changed to --C.N.G.V. d.o.o.--;
In item (73), "Izsola" should be changed to --Izola--.

Signed and Sealed this
First Day of January, 2019

Andrei Iancu
*Director of the United States Patent and Trademark Office*